E. W. SCHULTZ.
EXTENSION TABLE.
APPLICATION FILED JULY 28, 1910.

1,040,028.

Patented Oct. 1, 1912.

Witnesses:
Fred Palm
Chas. L. Goss.

Inventor:
Emil W. Schultz,
By Winkler Flanders Bottum & Fawsett
Attorneys.

UNITED STATES PATENT OFFICE.

EMIL W. SCHULTZ, OF WATERTOWN, WISCONSIN, ASSIGNOR OF ONE-HALF TO MAX H. GAEBLER, OF WATERTOWN, WISCONSIN.

EXTENSION-TABLE.

1,040,028.  Specification of Letters Patent.  Patented Oct. 1, 1912.

Application filed July 28, 1910. Serial No. 574,235.

*To all whom it may concern:*

Be it known that I, EMIL W. SCHULTZ, a citizen of the United States, residing at Watertown, in the county of Jefferson and State of Wisconsin, have invented certain new and useful Improvements in Extension-Tables, of which the following is a specification, reference being had to the accompanying drawing, forming a part thereof.

This invention relates to extension tables and the objects of the invention are to improve the construction of the table slides so as to cheapen the cost of production of such tables and to insure good, accurate joints between the table slides and the bridge piece and between the table slides and the tops of the table which are rigidly secured to some of the slides.

Figure 1:
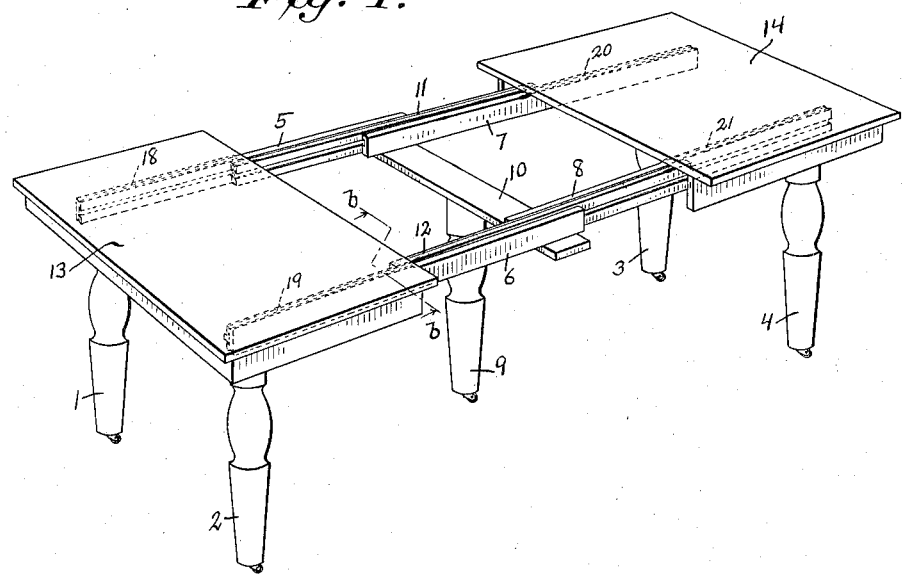
Figure 2:
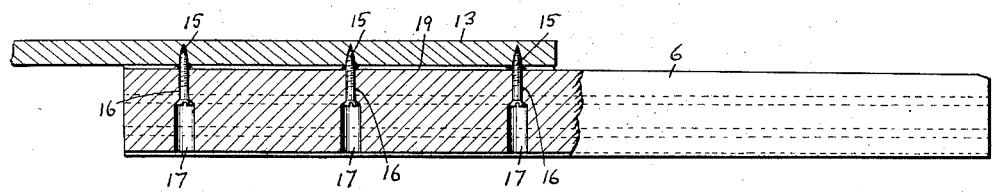

Referring to the drawings which accompany this specification and form a part thereof, on which drawings the same reference characters are used to designate the same elements wherever they may appear in each of the several views, and which drawings illustrate an embodiment of the invention described and claimed herein, Figure 1 is a perspective view of an extension table extended; Fig. 2 is a longitudinal section through a slide and top board of a table, a part of the slide being shown in elevation; and Fig. 3 is a vertical cross section of a part of the table taken on the line *b—b*, Fig. 1.

Referring specifically to the drawings, the reference numerals 1, 2, 3 and 4 designate the movable legs of an extension table with which are secured the slides 5, 6, 7 and 8 respectively. The numeral 9 designates the central stationary leg to which is secured the bridge piece 10 and to which bridge piece are secured the stationary slide members 11 and 12. The leaf or top board 13 is rigidly secured to slides 5 and 6 and the leaf or top board 14 is rigidly secured to the slides 7 and 8, the function and operation of these parts being the same as in the ordinary constructions of extension tables. The slides 5 and 6 and 7 and 8 are secured to and are slidable with respect to the fixed slides 11 and 12 in a well known manner, which does not require further description herein, and, of course, this invention can be applied to extension tables having a greater number of slides than the table illustrated by the drawings as will be readily understood.

Figure 3:
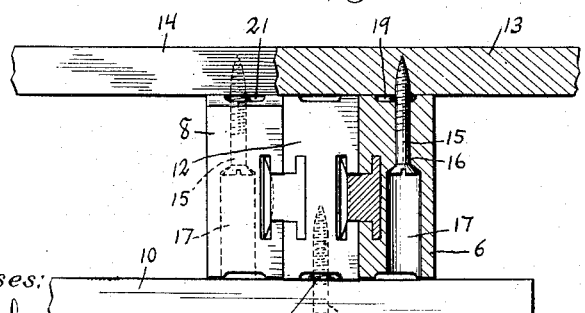

It is customary to secure the fixed leaves 13 and 14 to the movable end slides 5, 6, 7 and 8 and to secure the bridge piece 10 to the fixed slides 11 and 12 both by gluing said leaves and bridge piece to said slides and by securing said parts together by means of screws 15 which pass through apertures or holes 16 bored in the movable slides and which are then screwed into the leaves 13 and 14, as clearly shown by Figs. 2 and 3 of the drawings. It is also common to counterbore the holes 16, in the movable slides, to receive the heads of screws 15, as shown by Figs. 2 and 3 of the drawings, the counterbored portions of holes 16 being designated by the reference numeral 17. The screws securing the bridge piece 10 to the fixed slides 11 and 12, only one of which is shown by the drawings, are designated by the reference numeral 150, and the holes in the bridge piece through which they pass are designated by the reference numeral 160. In boring the holes for said screws the wood is more or less splintered when the drills or bits emerge from the wood so that considerable labor is required to remove the splinters and true up the surfaces. Moreover, even when the splinters have been removed and the surfaces have been trued up, as the holes are bored a little smaller than the screws to insure a tight fit, the wood splinters and bulges when the screws emerge therefrom with the result that it is impossible, without a great expenditure of time and labor, to make neat, good and accurate joints between the fixed leaves and the movable slides and between the bridge piece and the fixed slides.

This invention provides a cheap and simple construction for overcoming the difficulties heretofore encountered in uniting the parts of tables heretofore enumerated and the difficulties are overcome by providing the slides with longitudinal grooves into which the holes for the screws open. These longitudinal grooves are formed without any extra labor or care by simply providing an additional cutter to cut the same in the machine which is used to fashion and otherwise shape the slides. The longitudinal grooves in the upper faces of the movable slides 5, 6, 7 and 8 are designated by the reference numerals 18, 19, 20 and 21. It is preferred to provide the lower faces of the movable slides 5, 6, 7 and 8 with longitudinal grooves also so that they will slide more easily over the bridge piece 10. The fixed slides 11 and 12 are also provided with longitudinal grooves on their upper and lower faces the same as the movable slides. This construction of the fixed slides not only provides for the easy sliding of the fixed leaves 13 and 14 upon the fixed slides but also provides longitudinal grooves for the holes 160 in the bridge piece 10 to open into.

It will be readily apparent from an inspection of Figs. 2 and 3 of the drawings that the aforesaid longitudinal grooves allow clearance spaces to exist in line with the screw holes and between the parts to be fastened together so that splinters or burs raised by the boring tools or the screws are received within said clearance spaces and do not tend to force apart or separate the parts to be joined or secured together, viz: the movable slides and the fixed leaves of the table and the fixed slides and the bridge piece. Moreover the presence of the longitudinal grooves provides two contact edges or surfaces on each slide to bear against the part to be secured thereto and as the screws are located between said two contact edges or surfaces a firmer and neater joint can be secured than by the old manner of fastening. The longitudinal grooves also serve as receptacles to receive any excess glue and permit excess glue to be forced out from between the parts to be secured together whereby any uneven application or distribution of the glue does not prevent firm and close contact being effected between the parts by means of the screws.

The tops of the movable slides 5, 6, 7 and 8 are cut away slightly at the inner ends of the fixed leaves 13 and 14, as clearly shown by Figs. 1 and 2 of the drawings, to permit free movement under the opposite fixed leaf in closing and extending the table.

What is claimed is:

1. The combination in an extension table of slides provided with grooves in faces thereof, parts to be rigidly secured to said slides and against the faces thereof provided with said grooves and screws for securing said slides and parts together, holes which open into said grooves being provided for the passage of said screws.

2. The combination in an extension table of movable slides and a leaf rigidly secured thereto, said movable slides being provided with holes extending therethrough adapted to receive screws and with longitudinal grooves in the upper faces thereof beneath said leaf into which grooves said holes open, and screws in said holes and engaged with said leaf to secure said leaf and slides together.

3. The combination in an extension table of fixed slides and a bridge piece, said fixed slides being provided with longitudinal grooves in the faces thereof contacting with said bridge piece and said bridge piece being provided with holes adapted to receive screws, said holes opening into said grooves.

4. A movable slide for an extension table provided with holes therethrough adapted to receive screws and with a longitudinal groove in a face thereof into which said holes open and against which face a part is to be rigidly secured by said screws.

In witness whereof I hereto affix my signature in presence of two witnesses.

EMIL W. SCHULTZ.

Witnesses:
 MAX W. TERWEDO,
 HENRY WINKLER.